(12) United States Patent
Steg et al.

(10) Patent No.: US 11,075,595 B2
(45) Date of Patent: Jul. 27, 2021

(54) AXIAL FLUX MOTOR

(71) Applicant: Blue Canyon Technologies Inc., Boulder, CO (US)

(72) Inventors: Stephen Steg, Erie, CO (US); Matthew James Carton, Erie, CO (US)

(73) Assignee: Blue Canyon Technologies Inc., Boulder, CO (US)

( * ) Notice: Subject to any disclaimer, the term of this patent is extended or adjusted under 35 U.S.C. 154(b) by 0 days.

(21) Appl. No.: 16/719,212

(22) Filed: Dec. 18, 2019

(65) Prior Publication Data
US 2020/0212827 A1 Jul. 2, 2020

Related U.S. Application Data

(60) Provisional application No. 62/784,902, filed on Dec. 26, 2018.

(51) Int. Cl.
| | |
|---|---|
| *H02K 29/06* | (2006.01) |
| *H02P 6/10* | (2006.01) |
| *H02K 11/215* | (2016.01) |
| *H02K 21/24* | (2006.01) |
| *B64G 1/28* | (2006.01) |
| *B64G 1/36* | (2006.01) |
| *H02K 1/27* | (2006.01) |
| *H02K 21/14* | (2006.01) |
| *H02K 1/14* | (2006.01) |

(52) U.S. Cl.
CPC .............. *H02P 6/10* (2013.01); *B64G 1/283* (2013.01); *B64G 1/288* (2013.01); *B64G 1/366* (2013.01); *H02K 1/2793* (2013.01); *H02K 11/215* (2016.01); *H02K 21/145* (2013.01); *H02K 21/24* (2013.01); *H02K 1/145* (2013.01); *H02P 2207/05* (2013.01)

(58) Field of Classification Search
CPC ........ H02P 6/10; H02P 2207/05; H02P 21/06; H02P 2207/055; H02K 11/215; H02K 21/24; B64G 1/366
See application file for complete search history.

(56) References Cited

U.S. PATENT DOCUMENTS

| | | |
|---|---|---|
| 6,911,757 B2 | 6/2005 | Lopatinsky et al. |
| 2005/0093393 A1 | 5/2005 | Hirzel |
| 2006/0043916 A1 | 3/2006 | Henslee et al. |
| 2007/0290582 A1 | 12/2007 | Han et al. |
| 2011/0221287 A1 | 9/2011 | Lucchi et al. |
| 2013/0181565 A1 | 7/2013 | Petro et al. |
| 2015/0048695 A1 | 2/2015 | Stoltenberg et al. |
| 2016/0329795 A1* | 11/2016 | Ricci ................... H02K 1/2793 |
| 2017/0047793 A1 | 2/2017 | Klassen et al. |
| 2017/0098982 A1 | 4/2017 | Shaw |
| 2017/0317558 A1 | 11/2017 | Steg et al. |
| 2018/0337572 A1 | 11/2018 | Miyama et al. |

* cited by examiner

*Primary Examiner* — Karen Masih
(74) *Attorney, Agent, or Firm* — The Ollila Law Group LLC

(57) ABSTRACT

The present disclosure relates to an axial flux motor comprising a stator and a rotor. The stator comprises a first motor coil, a second motor coil, a first hall sensor, and a second hall sensor, and the rotor comprises a rotor platform member, an actuator magnet array arranged in an alternating axial polarity arrangement, a trigger magnet array, and a rotating magnetic return path member.

15 Claims, 10 Drawing Sheets

AXIAL FLUX MOTOR

CROSS-REFERENCE TO RELATED APPLICATION

This application claims priority from U.S. Provisional Patent Application No. 62/784,902, filed Dec. 26, 2018, entitled "AXIAL FLUX MOTOR," the contents of which are incorporated herein by reference.

TECHNICAL FIELD

The present Application is directed towards axial flux motors, and more particularly, towards axial flux motors with rotating magnetic return paths.

BACKGROUND

Spacecraft typically use rotatable devices, such as reaction wheels, momentum wheels, or gyroscopes, to control orientation and provide stability in flight. For example, spacecraft with three-axis control typically use three or more reaction wheels for redundancy.

When using a rotatable device to orient a spacecraft, it is important to avoid torque ripple in the motor. A torque ripple may cause positioning disturbances on a spacecraft, or vibrations, making the spacecraft less stable.

Previous spacecraft rotatable device motors did not provide a very uniform magnetic field through the motor phases. This caused pulsing of torque in the motor, generating disturbances in the spacecraft.

Some prior motors also did not energize the motor phases at precise points in the motor rotation, thereby generating further torque ripple in the motor. In order to energize the motor phases precisely, the position of the rotor must be known or estimated accurately enough when sequencing energizing the motor coils. One way that some prior axial flux motors determine the timing to sequence phases is using a hall sensor to detect a rotational position of a rotor. Prior motors provided too gradual a change in polarity of magnetic field for detection by the hall sensor, however. This introduced timing errors in the motor phase switching, and further torque ripple into the motor.

There is a need for a more precise and reliable motor without torque ripple, which otherwise overcomes the disadvantages of the prior art, or at least provides a useful alternative.

SUMMARY

According to an embodiment, an axial flux motor is provided. The axial flux motor comprises a stator and a rotor. The stator comprises a first motor coil, a second motor coil, a first hall sensor, and a second hall sensor. The rotor comprises a rotor platform member, an actuator magnet array, a trigger magnet array, and a rotating magnetic return path member. The actuator magnet array is coupled to the rotor platform member, arranged in an alternating axial polarity arrangement and positioned to provide an actuator magnet array magnetic field that intersects with a first motor coil magnetic field, and a second motor coil magnetic field. The trigger magnet array is coupled to the rotor platform member and positioned to provide a trigger magnet array magnetic field that intersects with the first hall sensor and the second hall sensor. The rotating magnetic return path member is coupled to the rotor platform member and configured to confine the actuator array magnetic field from the actuator magnet array.

According to an embodiment a method for actuating an axial flux motor is provided. The method comprises the step of energizing a first motor coil of the axial flux motor. The axial flux motor comprises a stator and a rotor. The stator comprises a first motor coil, a second motor coil, a first hall sensor, and a second hall sensor. The rotor comprises a rotor platform member, an actuator magnet array, a trigger magnet array, and a rotating magnetic return path member. The actuator magnet array is coupled to the rotor platform member, arranged in an alternating axial polarity arrangement, and positioned to provide an actuator magnet array magnetic field that intersects with a first motor coil magnetic field and a second motor coil magnetic field. The trigger magnet array is coupled to the rotor platform member and positioned to provide a trigger magnet array magnetic field that intersects with the first hall sensor and the second hall sensor. The rotating magnetic return path member is coupled to the rotor platform member and configured to confine the actuator array magnetic field from the actuator magnet array. The method further comprises the step of, upon detecting a change in polarity at the first hall sensor, energizing the second motor coil of the axial flux motor.

According to an embodiment, a method for assembling an axial flux motor is provided. The method comprises the step of providing an axial flux motor housing. The method further comprises the step of coupling a stator to the axial flux motor housing. The stator comprises a first motor coil, a second motor coil, a first hall sensor, and a second hall sensor. The method further comprises the step of coupling a rotor to the axial flux motor housing. The rotor comprises a rotor platform member, an actuator magnet array coupled to the rotor platform member, the actuator magnet array arranged in an alternating axial polarity arrangement and positioned to provide an actuator magnet array magnetic field that intersects with a first motor coil magnetic field and a second motor coil magnetic field, a trigger magnet array coupled to the rotor platform member, the trigger magnet array positioned to provide a trigger magnet array magnetic field that intersects with the first hall sensor and the second hall sensor, and a rotating magnetic return path member coupled to the rotor platform member and configured to confine the actuator array magnetic field from the actuator magnet array.

BRIEF DESCRIPTION OF THE DRAWINGS

Embodiments of the invention will now be described, by way of example only, with reference to the accompanying drawings in which.

DETAILED DESCRIPTION

The present disclosure describes axial flux motors for a rotatable device, and methods of actuating axial flux motors. FIGS. 1A-6 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1A:
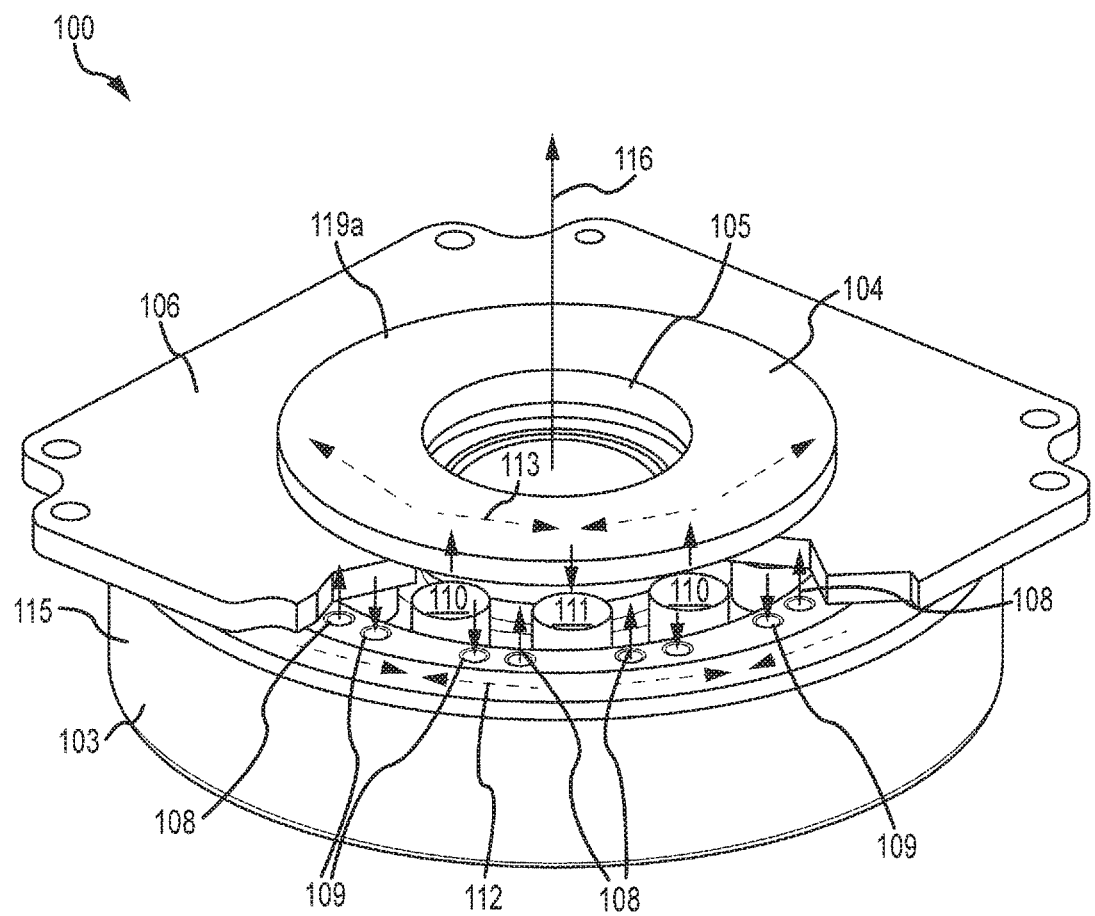
FIG. 1A depicts an isometric with cutaway view of axial flux motor 100, in accordance with an embodiment.
Figure 1B:
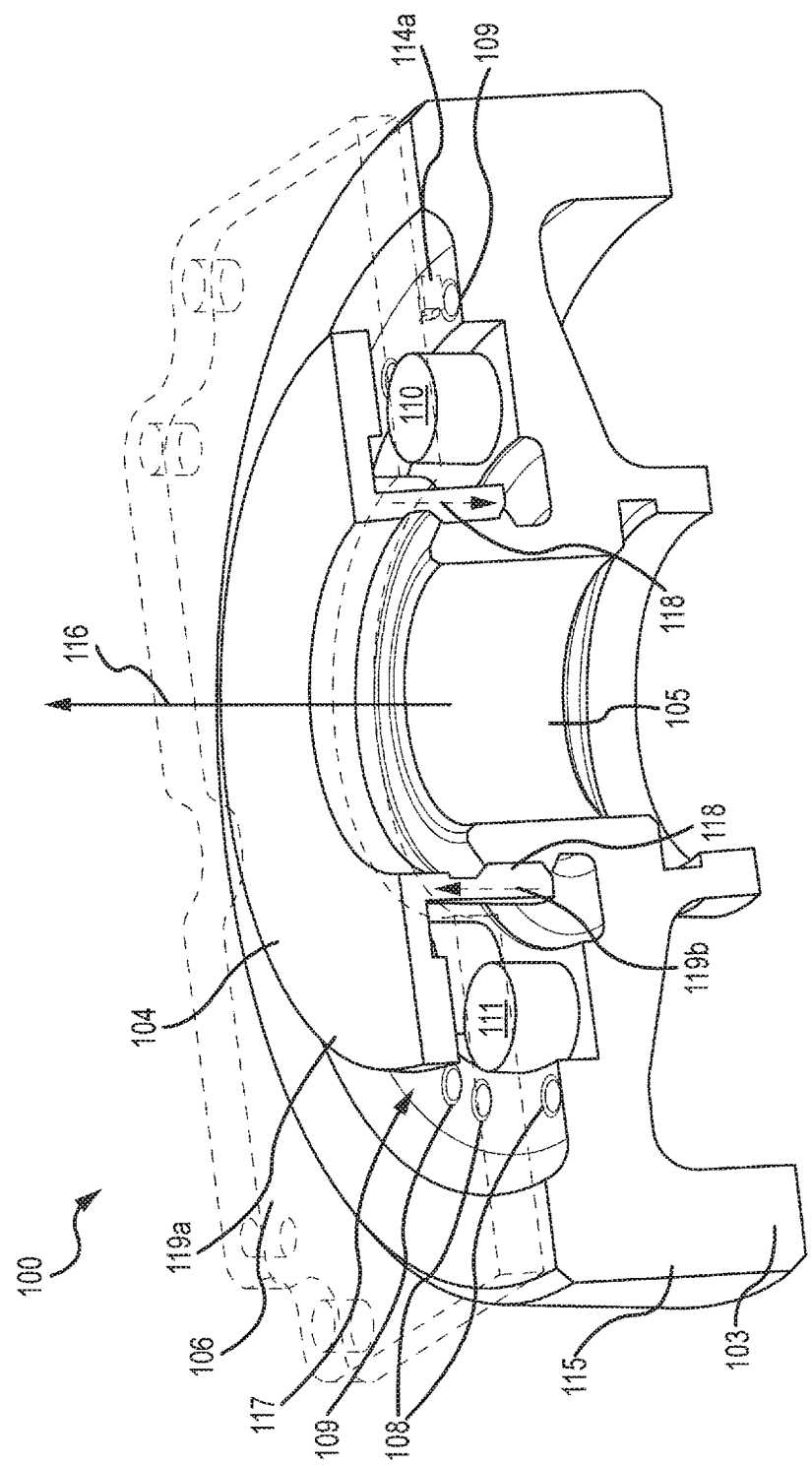
FIG. 1B depicts cross sectional view of axial flux motor 100, in accordance with an embodiment.
Figure 1C:
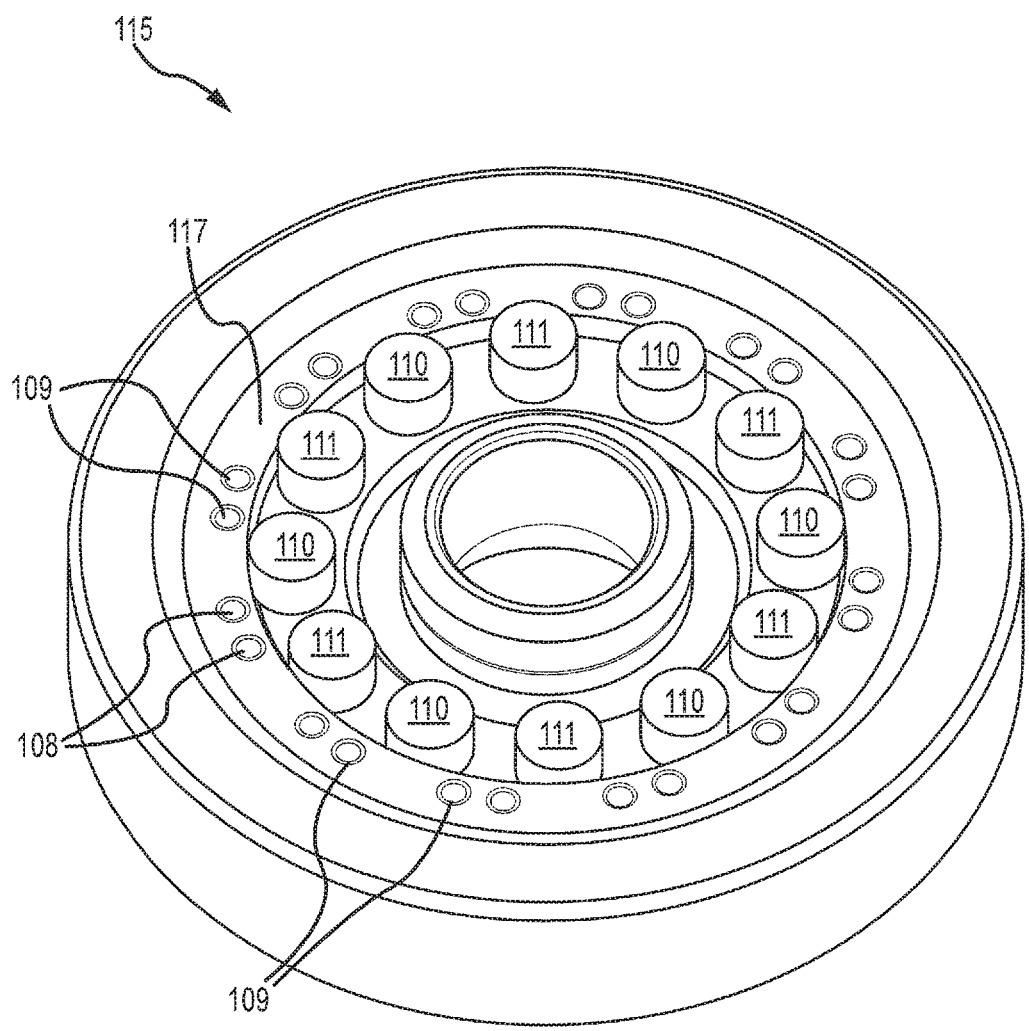
FIG. 1C depicts an isometric view of rotor platform member 115, in accordance with an embodiment.
Figure 1D:
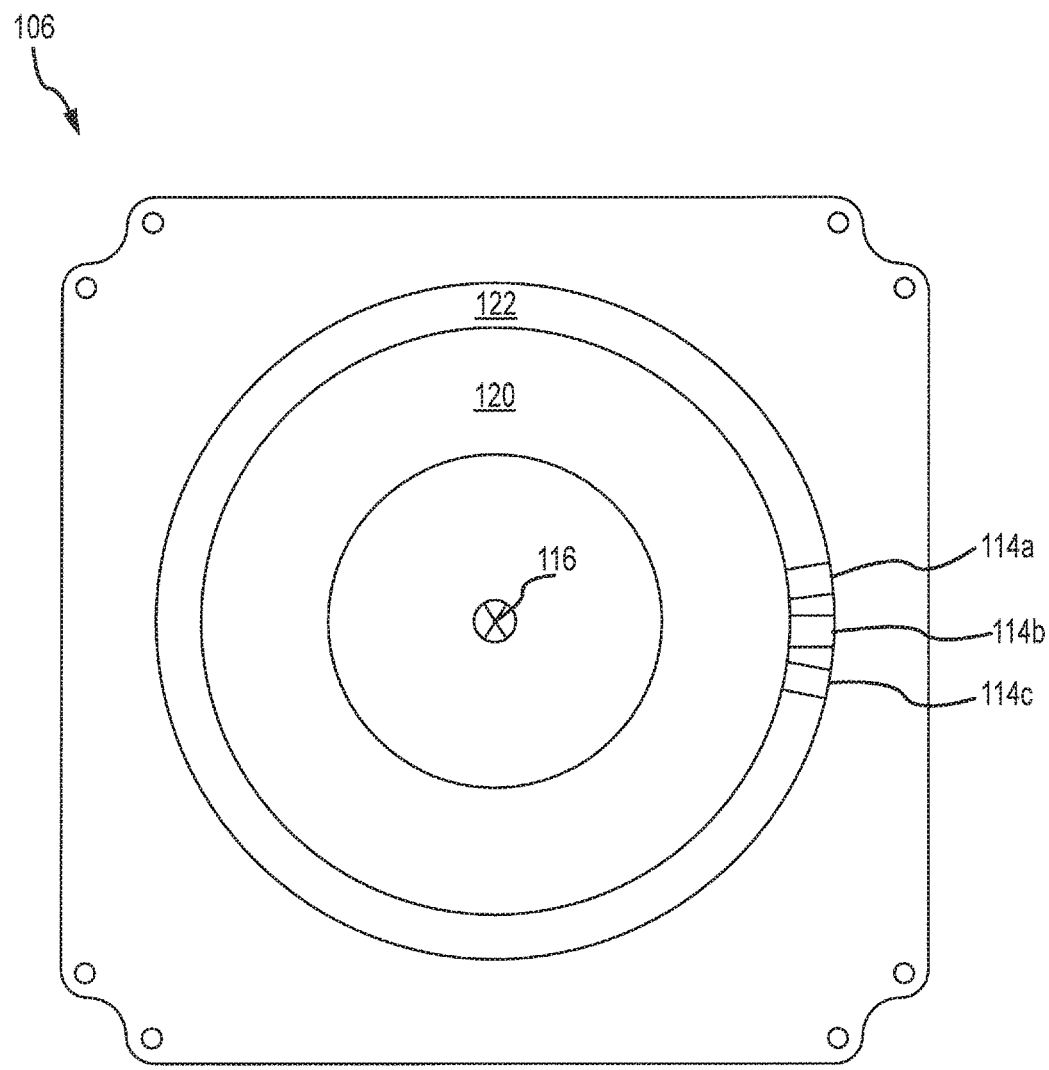
FIG. 1D depicts stator 106, in accordance with an embodiment.

FIGS. 1A to 1D depict views of axial flux motor 100, in accordance with an embodiment. FIG. 1A depicts an isometric with cutaway view of axial flux motor 100. FIG. 1B depicts cross sectional view of axial flux motor 100 with a transparent stator 106 to allow a view of the components of axial flux motor 100. FIG. 1C depicts an isometric view of rotor platform member 115. Finally, FIG. 1D depicts stator 106. In embodiments, axial flux motor 100 may comprise a reaction wheel assembly or a gyroscope for a spacecraft.

Axial flux motor 100 comprises a stator 106 and a rotor 103. Stator 106 is depicted in FIG. 1D. Stator 106 comprises a first motor coil, a second motor coil, a first hall sensor 114a, and a second hall sensor 114b. First motor coil and second motor coil (not individually depicted in FIG. 1D) are positioned within coil region 120.

The motor coils of stator 106 are oriented to generate a motor coil magnetic field that is perpendicular to an axially oriented actuator magnetic field provided by a first actuator magnet array 110, 111, which is further described below. The actuator magnet array magnetic field produces a force on the motor coil wires that is perpendicular to both the axially directed first actuator magnet array magnetic field and the direction of the current in the motor coil.

In embodiments, the motor coils of stator 106 may be wound within a circuit board substrate or may be wound from individual solid or stranded wire in coil region 120. In embodiments, first and second motor coils may be wound using a wave winding technique, a lap winding technique, or any other technique known to those of skill in the art.

Stator 106 comprises at least two hall sensors 114a, 114b, as may best be seen in FIG. 1D. Hall sensors 114a, 114b may be used to provide rotational position sensing to sequence the motor phasing. Hall sensors 114a, 114b detect a trigger magnet array magnetic field generated by a trigger magnet array 108, 109, which is further described below.

Hall sensors 114a, 114b are positioned within a trigger magnetic array magnetic field region 122, as may be seen in FIG. 1D. Trigger magnetic array magnetic field region 212 represents the surface area of stator 106 that is adjacent to, but axially displaced over a gap from trigger magnet array 108, 109. Trigger magnetic array magnetic field region 212 represents the best position on stator 106 to sense the trigger magnet array magnetic field. FIG. 1B, provides an additional view of the alignment between hall sensor 114a and trigger magnet array 108, 109.

In embodiments, stator 106 may comprise further hall sensors. For example, axial flux motor 100 may comprise a motor with three, or any additional number of motor phases. In embodiments, each motor phase may correspond to one or more hall sensors, as will be understood by those of skill in the art.

Axial flux motor 100 further comprises rotor 103. Rotor 103 comprises a rotor platform member 115, an actuator magnet array 110, 111, a trigger magnet array 108, 109, and a rotating magnetic return path member 104. Rotor platform member 115 may best be seen in FIG. 1C.

Rotor platform member 115 is the substrate upon which actuator magnet array 110, 111, trigger magnet array 108, 109, and rotating magnetic return path member may be coupled, as may best be seen in FIG. 1B. Rotor platform member 115 comprises a central aperture bearing seat 105 for bearings (not depicted) that may be used to couple the spinning inertia, including rotor platform member 115 and every component of axial flux motor 100 coupled to it, to one or more outer housings (not pictured). Rotor platform member 115 rotates around central axis 116.

In the embodiment of axial flux motor 100, rotor platform member 115 is annular in shape with a top inset portion 117 in which actuator magnet array 110, 111 and trigger magnet array 108, 109 are positioned. The embodiment of axial flux motor 100 is not intended to be limiting, however. As those of skill will readily understand, any rotor platform member 115 configuration may be possible that will allow for coupling of the rotor platform member 115 to a housing assembly, and for actuator magnet array 110, 111 and trigger magnet array 108, 109 to be coupled to the rotor platform member 115.

Rotor 103 further comprises actuator magnet array 110, 111. As may be seen in FIGS. 1A, 1B, and 1C, actuator magnet array 110, 111 is coupled to the rotor platform member 115 in a circular arrangement. Actuator magnet array 110, 111 is arranged in an alternating axial polarity arrangement, meaning that the individual actuator magnets of actuator magnet array 110, 111 are positioned to alternate their north and south poles axially. As may be seen in FIGS. 1A and 1C, the actuator magnets referenced as 110 are oriented such that their north poles are pointing towards the top and out of the page, and the actuator magnets referenced 111 are oriented such that their north poles are pointing towards the bottom and into the page. Actuator magnet array 110, 111 is positioned to provide an actuator magnet array magnetic field that intersects with a first motor coil magnetic field and a second motor coil magnetic field.

In the example embodiment, axial flux motor 100 comprises a plurality of individual actuator magnets 110, 111 coupled to rotor platform member 115 that form actuator magnet array 110, 111. In embodiments, actuator magnet array 110, 111 may comprise individual magnets that are round, square, rectangular, or arc-segments. Alternatively, however, actuator magnet array 110, 111 may comprise a single monolithic ring piece. In embodiments, actuator magnet array 110, 111 may comprise samarium-cobalt or neodymium-iron-boron magnets. In further embodiments, actuator magnet array 110, 111 may be comprise any size or spacing. For example, the individual actuator magnets comprising actuator magnet array 110, 111 may be sized between 0.125"D and 1.0"D, depending on the motor application, and spaced between 15 deg to 90 deg apart.

Rotor 103 further comprises trigger magnet array 108, 109. Trigger magnet array 108, 109 is coupled to the rotor platform member 115 in a circular arrangement. Trigger magnet array 108, 109 is positioned to provide a trigger magnet array magnetic field that intersects with the first hall sensor 114a and the second hall sensor 114b of stator 106. The trigger magnet array magnetic field allows either hall sensor 114a or hall sensor 114b to detect a rotational position of rotor 106 when a change in polarity in the trigger magnet array magnetic field is sensed.

The combination of trigger magnet array 108, 109 and hall sensors 114a, 114b allow a control electronics for axial flux motor 100 to switch phases with very little timing error. Minimizing timing errors helps prevent torque ripple in the motor, thereby preventing unwanted vibrations and loss in efficiency in axial flux motor 100.

In FIGS. 1A and 1C, it may be seen that the trigger magnets referenced as 108 are oriented such that their north poles are pointing towards the top and out of the page, and the actuator magnets referenced 109 are oriented such that their north poles are pointing towards the bottom and into the page. In FIG. 1B, it may be seen that effect hall sensor 114a is positioned adjacent to trigger magnet array 108, 109 in the axial direction 116.

In embodiments, trigger magnet array 108, 109 may include at least two trigger magnets for every actuator magnet of the actuator magnet array. For example, in FIG. 1C it may be seen that the first actuator magnet array 110, 111 includes 12 actuator magnets, while example trigger magnet array 108, 109 comprises 24 trigger magnets. As those of skill will readily understand, other multiples of trigger magnets are possible for each actuator magnet that provide at least two trigger magnets for every actuator magnet.

In the example of axial flux motor 100, the trigger magnets are arranged along a circle having a greater radius than the actuator magnet array 110, 111. Providing two trigger magnets for every actuator magnet of a motor may allow for a more consistent trigger magnet magnetic field, thereby providing a more distinct change between north and south polarity to provide more exact positioning and phase sequencing. This may help further reduce torque ripple in axial flux motor 100.

In embodiments, trigger magnet array 108, 109 may alternate in sequence between at least two trigger magnets having a first axial polarity orientation and at least two trigger magnets having a second axial polarity orientation. For example, as may be seen in FIGS. 1A and 1C, trigger magnets array 108, 109 alternates between two trigger magnets having a first axial polarity orientation 108 and two trigger magnets having a second axial polarity orientation 109. This may help provide a more consistently north or south magnetic field at hall sensors 114a, 114b, 114c between polarity switches.

In embodiments, at least two trigger magnets having a first axial polarity orientation may be positioned adjacent to an actuator magnet having the opposing polarity orientation. For example, it may be seen in FIGS. 1A and 1C that actuator magnets 110, which have their north poles pointing towards the top of the figures, are positioned adjacent to trigger magnets 109, which have their south poles oriented towards the top of the figure. Similarly, actuator magnets 111, which are oriented such that their south poles are pointing towards the top of the figure, are positioned adjacent to trigger magnets 108, which are oriented such that their north poles oriented towards the top of the figure.

In examples, the trigger magnet array 108, 109 may include a trigger magnet having a first axial polarity orientation and a trigger magnet having a second axial polarity orientation positioned between every pair of actuator magnets of the actuator magnet array. For example, in FIGS. 1A and 1C, it may be seen that between every actuator magnet pair 110 and 111, there are two trigger magnets including a trigger magnet 108 having a first axial polarity orientation and a trigger magnet 109 having a second axial polarity orientation. This may allow hall sensors 114a, 114b, 114c to more accurately detect when to execute a phase change of axial flux motor 100 without causing ripple torque.

In embodiments, each adjacent trigger magnet pair comprising a trigger magnet having a first axial polarity orientation 108 and a trigger magnet having a second axial polarity orientation 108 of the trigger magnet array 108, 109 may be positioned substantially more closely together than the trigger magnets having the same axial polarity orientation. For example, as may be seen in FIGS. 1A and 1C, adjacent trigger magnets 108 or 109 having a first or second axial polarity orientation are much further spaced apart than adjacent pairs of trigger magnets having a first axial polarity orientation 108 and a second axial polarity orientation 109. By providing for a trigger magnet array magnetic field that abruptly switches between a consistent north or south magnetic field, it may be possible to time the sequencing of motor phases more precisely, thereby decreasing the torque ripple in axial flux motor 100.

In embodiments, the trigger magnet array may have a radius that is greater than a radius of the actuator magnet array. This may provide for finer positioning, thereby allowing more precise switching timing.

In embodiments, trigger magnet array 108, 109 may comprise any shape or format of magnets known to those of skill. In embodiments, trigger magnet array 108, 109 may comprise individual magnets or a unitary ring magnet.

Rotor 103 further comprises rotating magnetic return path member 104 coupled to the rotor platform member 115. Rotating magnetic return path member 104, which may be seen in FIGS. 1A and 1B, is configured to confine the actuator array magnetic field from the actuator magnet array 110, 111 and complete the magnetic field between every adjacent actuator magnet pair of the actuator magnet array 110, 111, thereby providing first magnetic return paths 113.

In the example, rotating magnetic return path member 104 is formed as a single integrated piece having two portions. The first portion 119a of rotating magnetic return path member 104 is a first annular disk having a primary dimension that extends perpendicular to the axis of the axial flux motor 100. The second portion 119b of rotating magnetic return path member 104 is a second annular disk having a primary dimension that extends parallel to the axis of the axial flux motor 100. The first portion 119a is coupled to the second portion 119b at an inner surface of the first portion, to form a ring-shaped rotating magnetic return path member 104 having an inverted L-shaped cross section. The example of rotating magnetic return path member 104 is not intended to be limiting, however. As those of skill in the art will readily understand, any shape of magnetic return path member is possible that confines at least some of the flux from the actuator magnet array magnetic field to provide a low reluctance path for the magnetic flux. Moreover, while rotating magnetic return path member 104 is formed as a single integrated part, those of skill will further understand that rotating magnetic return path member 104 may alternatively be formed from any multiple of parts.

Rotating magnetic return path member 104 may allow for a more uniform actuator magnet array magnetic field through the motor coils. By minimizing eddy currents in the flux return path, this may provide a more electrically efficient motor design that is capable of higher speeds with lower power. In examples, rotating magnetic return path member 104 comprises a magnetically permeable steel alloy.

In embodiments, the rotating magnetic return path member 104 may comprise a perpendicular magnetic return path component that is oriented to couple the actuator magnetic flux in a direction perpendicular to a north/south magnet orientation of the actuator magnet array 110, 111. For example, first magnetic return path 113 is confined to first portion 119a, and oriented in a direction perpendicular to the orientation of actuator magnet array 110, 111.

In embodiments, rotating magnetic return path member 104 may comprise a parallel magnetic return path component that is operable to couple the actuator magnetic flux in a direction parallel to a north/south magnet orientation of the actuator magnet array 110,111. For example, as may be seen in FIG. 1B, rotating magnetic return path member 104 includes a parallel magnetic return path 118 confined to second portion 119b.

In embodiments, the rotor platform member 103 itself may further comprise a rotor platform magnetic return path 112. For example, it may be seen in FIG. 1A that rotor platform magnetic return path 112 confines the actuator magnet array magnetic field in a tangential direction. In embodiments, rotor 103 may be manufactured from a magnetically permeable steel alloy. By providing a rotor platform magnetic return path 112, this may further allow rotor 103 to store momentum (angular velocity*inertia).

Figure 2A:
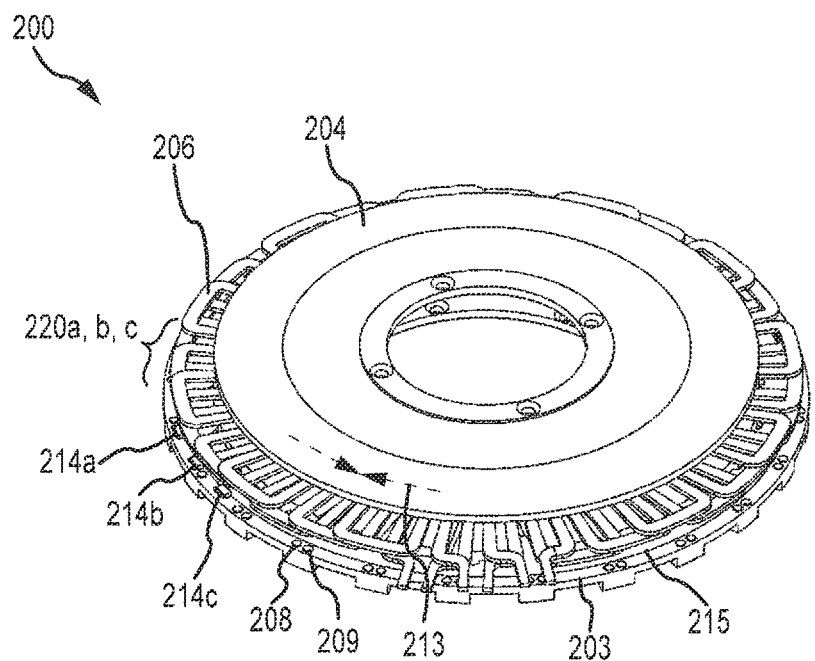
FIG. 2A depicts an isometric view of axial flux motor 200, in accordance with an embodiment.
Figure 2B:
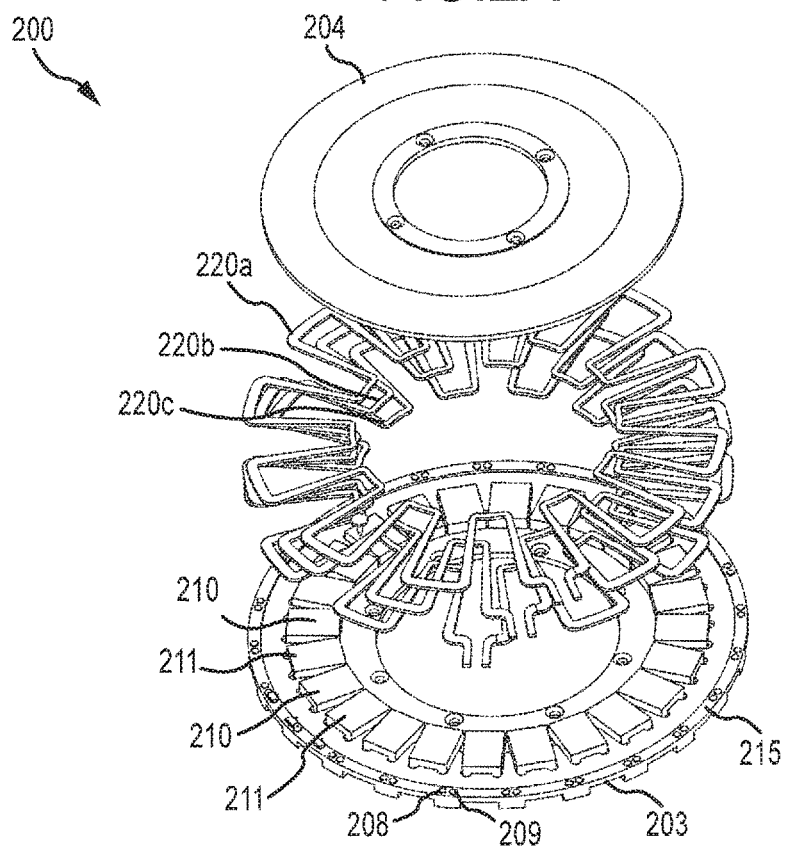
FIG. 2B depicts an exploded view of axial flux motor 200, in accordance with an embodiment.

FIGS. 2A and 2B depict a further axial flux motor 200 in accordance with an embodiment. In embodiments, axial flux motor 200 may be suited to higher torque applications than axial flux motor 100.

Like axial flux motor 100, axial flux motor 200 comprises stator 206 and rotor 203. Stator 206 comprises first motor coil 220a and second motor coil 220b. In further examples, however, stator 206 may further comprise a third motor coil 220c, or any additional number motor coils, however, as will be understood by those of skill.

Stator 206 may comprise a stator substrate upon which motor coils 220a, 220b, 220c may be formed or coupled. In FIGS. 2A and 2B, a stator substrate is not depicted to allow for better visibility of the alignment between motor coils 220a, 220b, 220c, actuator magnet array 210, 211, and trigger magnet array 208, 209.

In the example of axial flux motor 200, motor coils 220a, 220b, 220c comprise a flat wound set of coil. For example, motor coils 220a, 220b, and 220c may comprise stranded litz wire.

Stator 206 further comprises at least first hall sensor 214a, and second hall sensor 214b. Hall sensors 214a, 214b are similar to hall sensors 114a, 114b described above in reference to axial flux motor 100. In embodiments, stator 206 may further comprise a third hall sensor 214c, or any further number of hall sensors.

Axial flux motor 200 further comprises rotor 203. Rotor 203 comprises a rotor platform member 215. In the example of axial flux motor 200, rotor platform member 215 is shaped as a substantially annular disk. Any format of rotor platform member 215 is possible that allows for the coupling of an actuator magnet array and a trigger magnet array to its surface, however, as will be understood by those of skill.

Rotor 203 further comprises actuator magnet array 210, 211. Similar to actuator magnet array 110, 111, first actuator magnet array 210, 211 is configured in an alternating axial polarity arrangement, and positioned to provide a first actuator magnet array magnetic field that intersects with a first motor coil 220a magnetic field and a second motor coil 220b magnetic field. FIGS. 2A and 2B, the actuator magnets referenced as 210 are oriented such that their north poles are pointing towards the top and out of the page, and the actuator magnets referenced 211 are oriented such that their north poles are pointing towards the bottom and into the page.

Rotor 203 further comprises a trigger magnet array 208, 209. Similar to the arrangement of axial flux motor 100, trigger magnet array 208, 209 is coupled to rotor platform member 215, and positioned to provide a trigger magnet array magnetic field that intersects with the first hall sensor 214a and the second hall sensor 214b.

In the example of axial flux motor 200, first actuator magnet array 210, 211 comprises square actuator magnets and trigger magnet array 208, 209 comprises circular magnets. Those of skill will understand that any shape or format of actuator or trigger magnets are possible, however.

Rotor 203 further comprises rotating magnetic return path member 204 coupled to the rotor platform member 215 to rotate with the rotor platform member 215, the rotating magnetic return path member 204 configured to confine the actuator array magnetic field from the actuator magnet array 210, 211.

First rotating magnetic return path member 204 may be seen in FIGS. 2A and 2B. Similar to rotating magnetic return path member 104 described with regards to axial flux motor 100 above, first rotating magnetic return path member 204 may complete the magnetic field between two adjacent actuator magnets of the actuator magnet array 210, 211 oriented with opposing axial polarity orientations, thereby providing a first magnetic return path 213.

First rotating magnetic return path member 204 may allow for a more uniform actuator magnet array magnetic field through the motor coils for a higher torque axial flux motor 200.

In embodiments, axial flux motors 100 and 200 may further comprise a second actuator magnet array. For example, axial flux motor 100 may include a second actuator magnet array on the opposing side of rotor platform member 115, and axial flux motor 200 may include a second actuator magnet array on the surface of first rotating magnetic return path member 204 facing stator 206. A second actuator magnet array may provide for a higher strength magnetic field, with more uniform field lines such that every wire in the motor coils is exposed to the same magnetic field. This may further help minimize vibration from the motor In further embodiments, axial flux motor 100 or axial flux motor 200 may further comprise a second magnetic return path member.

In embodiments, axial flux motor 100 may further comprise an electronics operable to energize the first motor coil, and upon detecting a change in polarity at the first hall sensor, energize the second motor coil.

Figure 3:
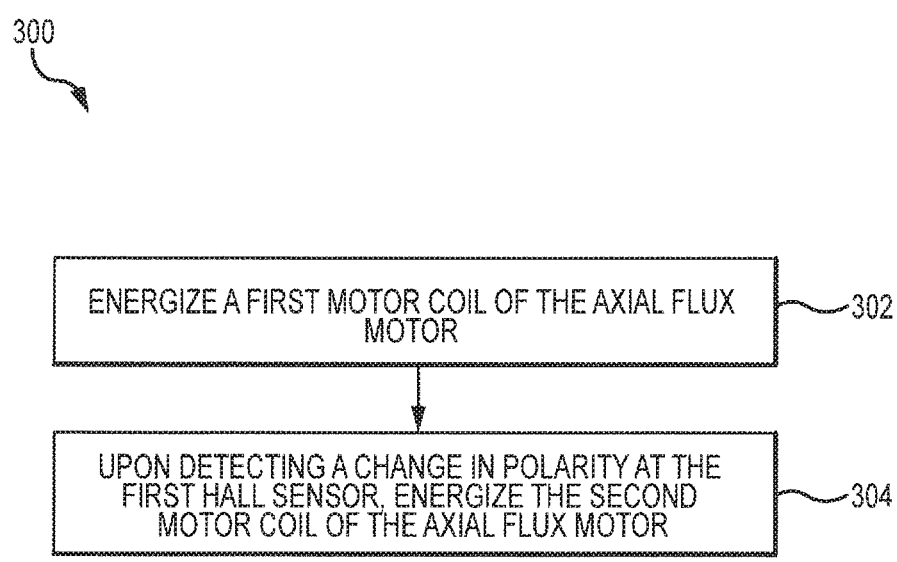
FIG. 3 depicts method 300, in accordance with an embodiment.

FIG. 3 depicts method 300 in accordance with an embodiment. Method 300 may be used to actuate axial flux motors 100 or 200, thereby sequencing the phases of the motor. Method 300 may be executed with specialized electronics integrated with or in communication with axial flux motor 100 or 200. In embodiments, the electronics may comprise a memory and a processor, an FPGA, or may simply provide the motor phase sequencing via electronics.

Method 300 begins with step 302. In step 302, a first motor coil of the axial flux motor is energized. For example, first motor coil 220a of axial flux motor 200 may be energized.

Method 300 continues with step 304. In step 304, upon detecting a change in polarity at the first hall sensor, the second motor coil of the axial flux motor is energized. For example, first hall sensor 214a of axial flux motor 200 may detect a change in polarity of trigger magnet array magnetic field. An electronics associated with axial flux motor 200 may then energize second motor coil 220b. In this way, the phases of axial flux motor 200 may be sequenced, causing rotor 203 to rotate.

In embodiments, step 304 may be repeated to energize the first motor coil 220a again based on detecting a change in polarity of second hall sensor 212b. In further embodiments, however, axial flux motor 100, 200 may comprise a third motor coil 212c, or any additional number of motor coils, each additional motor coils being associated with a respective hall sensor. Steps 302 and 304 may then be repeated to sequence the additional motor phases.

Figure 4A:
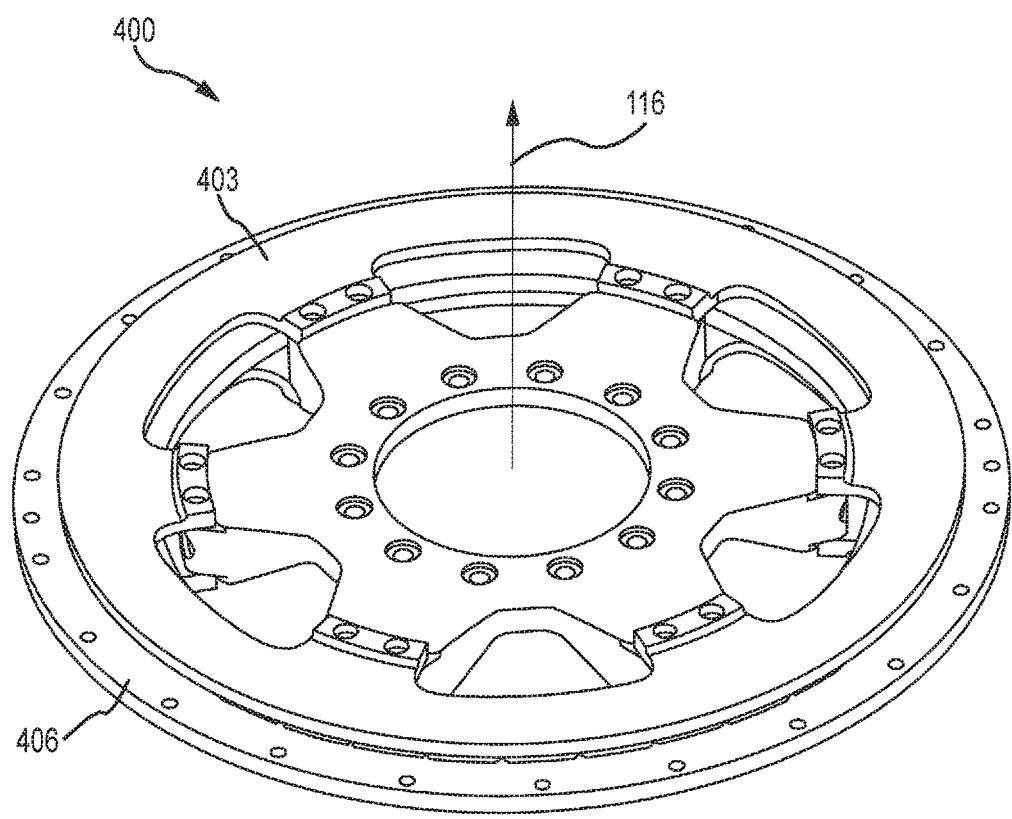
FIG. 4A depicts an isometric view of axial flux motor 400, in accordance with an embodiment.
Figure 4B:
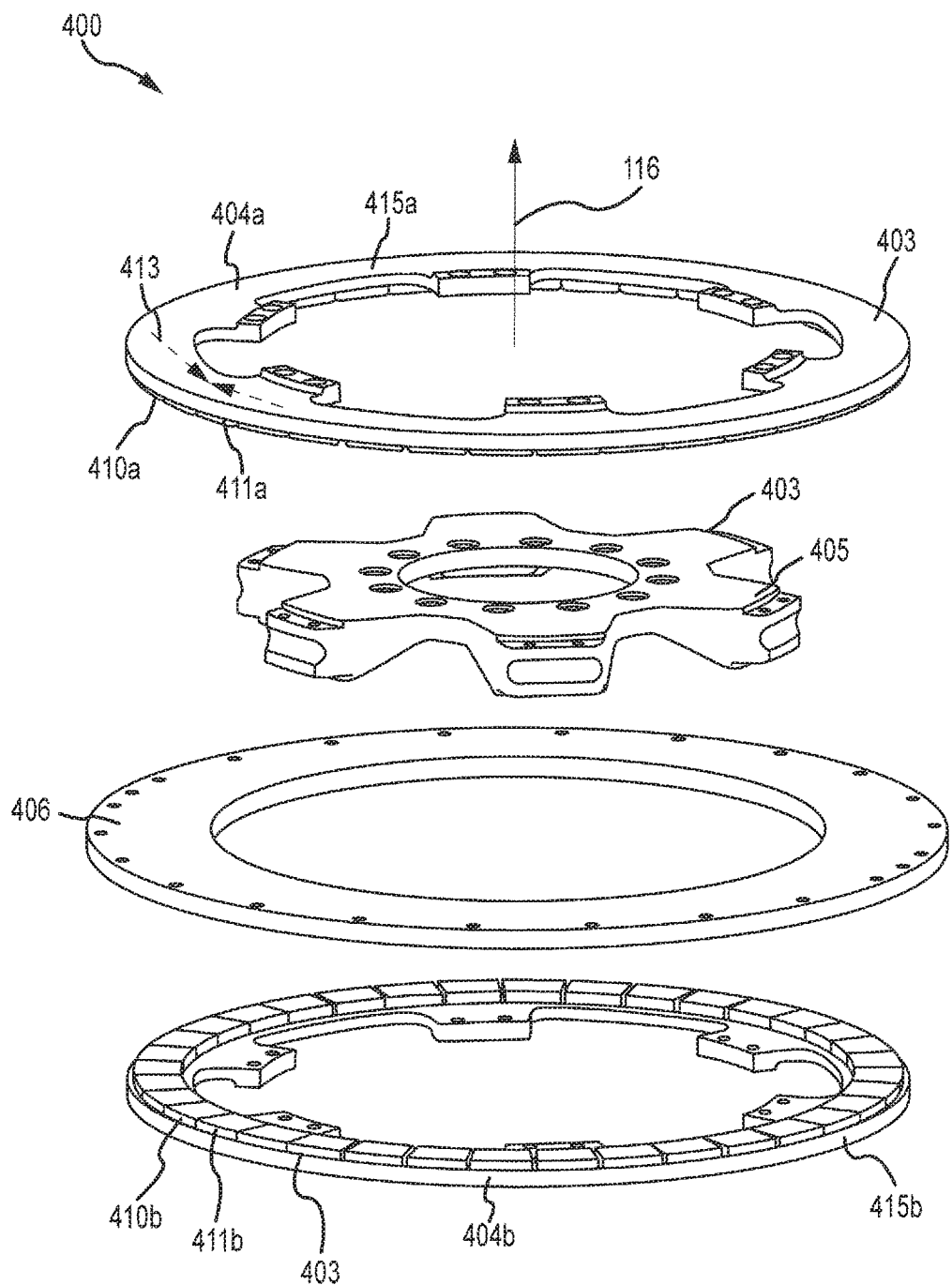
FIG. 4B depicts an exploded view of axial flux motor 400, in accordance with an embodiment.

FIGS. 4A and 4B depict a further axial flux motor 400 in accordance with an embodiment. Axial flux motor 400 may be suited to larger and higher torque applications.

Axial flux motor 400 includes a stator 406. Similar to stators 106 and 206 of axial flux motors 100, 200, stator 406 comprises a first motor coil and a second motor coil (not visible in the figures).

Axial flux motor 400 further comprises a rotor 403. Rotor 403 comprises a first actuator magnet array 410a, 411a and a second actuator magnet array 410b, 411b. Both first actuator magnet array 410a, 411a and second actuator magnet array 410b, 411b are configured in an alternating axial polarity arrangement, and positioned to provide a first actuator magnet array magnetic field and a second actuator magnet array magnetic field that intersects with a first motor coil magnetic field and a second motor coil magnetic field.

For example, the actuator magnets referenced as 410a and 410b in FIG. 4B are oriented such that their north poles are pointing towards the top and out of the page, and the actuator magnets referenced 411a and 411b are oriented such that their north poles are pointing towards the bottom and into the page.

Rotor 403 further comprises a first rotating magnetic return path member 404a configured to confine the first actuator magnet array magnetic field from the first actuator magnet array 410a, 411a.

In embodiments, the first rotating magnetic return path member 404a may comprise a first rotor platform member 415a coupled to the first actuator magnet array. In the example of axial flux motor 400, first rotating return path member 404a comprises a substantially annular disk component to which first actuator magnet array 410a, 411a is directly coupled. In further embodiments, however, first actuator magnet array 410a, 411a may be coupled to an additional actuator magnet array platform member, and first rotating magnetic return path member 404a may be coupled to the additional magnet array platform member, via any method known to those of skill.

As may be seen in the exploded diagram in FIG. 4B, first rotating magnetic return path member 404a provides a magnetic return path 413, confining the flux from adjacent magnets of first actuator magnet array 410a, 411a. In embodiments, first rotating magnetic return path member 404a may be sufficiently thick in the axial direction to avoid saturation.

It is noted that first rotating magnetic return path member 404a may comprise one or more inner coupling components 430 that allow rotating magnetic return path member 404a to be coupled to the other components comprising rotor 403. In the example of axial flux motor 400, the one or more coupling components 430 comprise one or more tabs including apertures for fasteners. Coupling members 430 are positioned to extend away from first rotating magnetic return path member 404a in an inward radial direction.

By providing a first and a second actuator magnet array 410a, 411a, 410b, 411b, in combination with first magnetic return path member 404a, axial flux motor 400 may be able to provide a higher strength and more uniform actuator magnet array magnetic field through the motor phases, lowering ripple torque in the motor. This may especially be helpful for higher torque motors, which tend to have thicker motor phases.

In embodiments, axial flux motor 400 may further comprise a second rotating magnetic return path member 404b configured to confine the second actuator magnet array magnetic field from the first actuator magnet array 410b, 411b. This may further reduce torque ripple in axial flux motor 400.

In examples, second rotating magnetic return path member 404b may comprise substantially the same shape and format as first rotating magnetic return path member 404a described above. As those of skill will readily understand, however, other shapes and formats of first and second rotating magnetic return path members 404a, 404b are possible, and first and second rotating magnetic return path members 404a, 404b need not have the same configurations.

In examples, second rotating magnetic return path member 404a may comprise a second rotor platform member 415b coupled to the second actuator magnet array 410b, 411b.

In embodiments, rotor 403 may further comprise a coupling member 405 connecting the first rotor platform member 415a to the second rotor platform member 415b. In the example of axial flux motor 400, coupling member 405 comprises a central hub with outer flanges that may be coupled to the one or more inner coupling components 430 of the first and second rotor platform members 415a, 415b. Coupling member 405 further includes a central aperture for coupling rotor 403 to a set of bearings (not depicted). Other formats for coupling member 405 are possible, however, as will be understood by those of skill.

In embodiments, coupling member 405 may be further configured to confine at least one of the first actuator magnet array magnetic field from the first actuator magnet array 410a, 411a or the second actuator magnet array magnetic field from the second actuator magnet array 410b, 411b. This may provide an even more uniform magnetic field within axial flux motor 400.

In embodiments, first rotating magnetic return path member 404a may comprise a perpendicular magnetic return path component 413 that is oriented to couple the first actuator magnet array magnetic field in a direction perpendicular to an axial direction 116 of the axial flux motor 400. The perpendicular magnetic return path 413 is similar to the perpendicular magnetic return path 113 described with regards to axial flux motor 100 above.

In embodiments, first rotating magnetic return path member 404a may comprise a parallel magnetic return path component (not depicted) that is oriented to couple the actuator magnetic flux in a direction parallel to the axial direction of the axial flux motor. The parallel magnetic return path is similar to the parallel magnetic return path 118 described with regards to axial flux motor 100 above.

In embodiments, first actuator magnet array 410*a*, 411*a* may comprise a plurality of actuator magnets coupled to first rotor platform member 415*a*. Similarly, second actuator magnet array 410*b*, 411*b* may comprise a plurality of actuator magnets coupled to second rotor platform member 415*b*.

For example, it may be seen in FIG. 4B that the actuator magnets comprise square magnets coupled to rotor 403. Other embodiments of actuator magnet are also possible, however, as noted above with respect to axial flux motors 100 and 200.

Axial flux motor 400 may further include one or more position sensors (not depicted). The position sensors may comprise hall sensors, optical encoders, resolvers, or any other type of position sensor known to those of skill. In further embodiments, however, axial flux motor may run open-loop without feedback.

Figure 5:
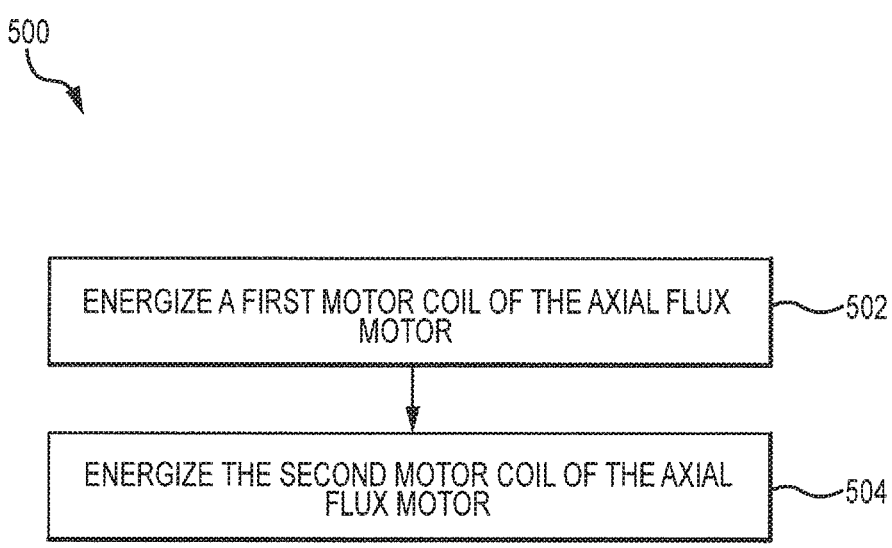
FIG. 5 depicts a method 500 in accordance with an embodiment.

FIG. 5 depicts method 500 in accordance with an embodiment. Method 500 may be used to actuate axial flux motor 400, thereby sequencing the phases of the motor. Method 500 may be executed on specialized electronics integrated with axial flux motor 400. In embodiments, the electronics may comprise a memory and a processor, an FPGA, or may simply provide the motor phase sequencing via electronics. In embodiments, axial flux motor 400 may be energized, or commutated, in what is known as a "6-step" commutation, or a sinusoidal commutation.

In step 502, a first motor coil of the axial flux motor 400 is energized. In step 504, a second motor coil of axial flux motor 400 is energized. In embodiments, the sequential timing between energizing the first and second motor coils may be determined based on a predetermined timer or based on a motor position sensor. An electronics associated with axial flux motor 200 may then energize second motor coil 220*b*. In this way, the phases of axial flux motor 200 may be sequenced, causing rotor 203 to rotate.

In embodiments, step 502 may be repeated to energize the first motor coil again. In further embodiments, however, axial flux motor 400 may comprise any additional number of motor coils, which are energized in sequence after step 504.

Figure 6:
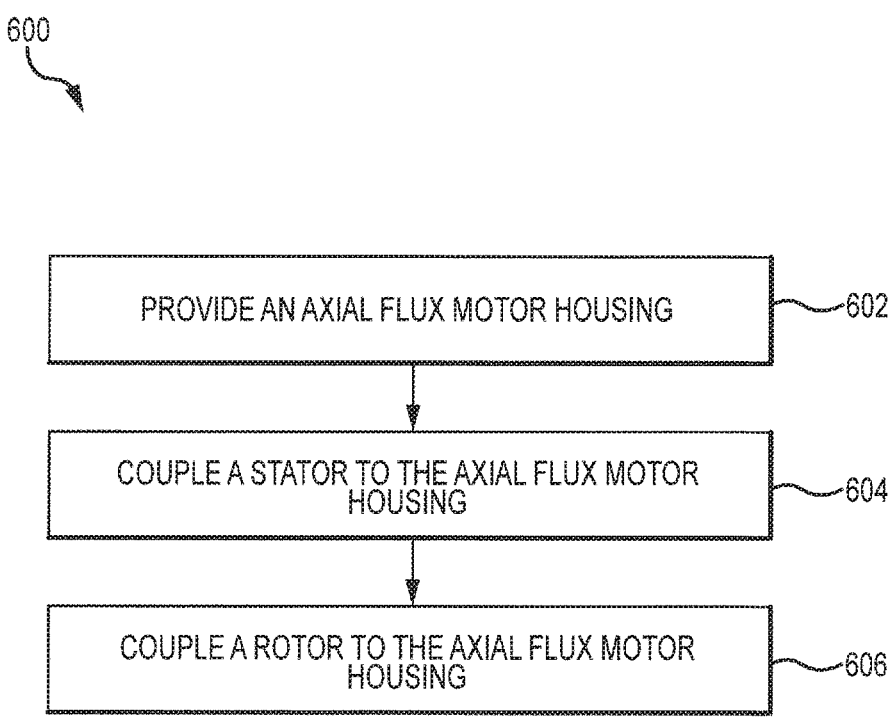
FIG. 6 depicts method 600, in accordance with an embodiment.

FIG. 6 depicts method 600 in accordance with an embodiment. Method 600 may be used to assemble axial flux motors 100, 200, or 400.

Method 600 begins with step 602. In step 602, an axial flux motor housing is provided. In embodiments, the axial flux motor housing may take any format allowing for the coupling of a stator and a rotor to the housing, as will be understood by those of skill.

Method 600 continues with step 604. In step 604, a stator is coupled to the axial flux motor housing. For example, stator 106, 206, or 406 may be coupled to an axial flux motor housing, according to any coupling method known to those of skill.

Method 600 continues with step 606. In step 606, a rotor is coupled to the axial flux motor housing. For example, rotor 103, 203, or 403 may be coupled to the axial flux motor housing via any type of bearing known to those of skill to allow rotor 103, 203, or 403 to rotate with respect to the axial flux motor housing.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

What is claimed is:

1. An axial flux motor, comprising:
   a stator comprising:
      a first motor coil,
      a second motor coil,
      a first hall sensor, and
      a second hall sensor; and
   a rotor comprising:
      a rotor platform member;
      an actuator magnet array coupled to the rotor platform member, the actuator magnet array arranged in an alternating axial polarity arrangement and positioned to provide an actuator magnet array magnetic field that intersects with a first motor coil magnetic field and a second motor coil magnetic field;
      a trigger magnet array coupled to the rotor platform member, the trigger magnet array positioned to provide a trigger magnet array magnetic field that intersects with the first hall sensor and the second hall sensor; and
      a rotating magnetic return path member coupled to the rotor platform member and configured to confine the actuator magnet array magnetic field from the actuator magnet array.

2. The axial flux motor of claim 1, wherein the rotating magnetic return path comprises a perpendicular magnetic return path component that is oriented to couple the actuator magnet array magnetic field in a direction perpendicular to a north/south magnet orientation of the actuator magnet array.

3. The axial flux motor of claim 1, wherein the rotating magnetic return path member comprises a parallel magnetic return path component that is oriented to couple the actuator magnet array magnetic field in a direction parallel to a north/south magnet orientation of the actuator magnet array.

4. The axial flux motor of claim 1, wherein the rotor platform member further comprises a rotor platform magnetic return path.

5. The axial flux motor of claim 1, wherein the trigger magnet array includes at least two trigger magnets for every actuator magnet of the actuator magnet array.

6. The axial flux motor of claim 5, wherein the trigger magnet array alternates in sequence between at least two trigger magnets having a first axial polarity orientation and at least two trigger magnets having a second axial polarity orientation.

7. The axial flux motor of claim 5, wherein the trigger magnet array includes a trigger magnet having a first axial polarity orientation and a trigger magnet having a second axial polarity orientation between every pair of actuator magnets of the actuator magnet array.

8. A method for actuating an axial flux motor, comprising:
   energizing a first motor coil of the axial flux motor, the axial flux motor comprising a stator comprising the first motor coil, a second motor coil, a first hall sensor, and a second hall sensor, and a rotor comprising a rotor platform member, an actuator magnet array coupled to the rotor platform member, arranged in an alternating axial polarity arrangement, and positioned to provide an actuator magnet array magnetic field that intersects with a first motor coil magnetic field and a second motor coil magnetic field, a trigger magnet array coupled to the rotor platform member, the trigger magnet array positioned to provide a trigger magnet array magnetic field that intersects with the first hall sensor and the second hall sensor, and a rotating magnetic return path member coupled to the rotor platform member, the rotating magnetic return path member configured to confine the actuator magnet array magnetic field from the actuator magnet array; and upon detecting a change in polarity at the first hall sensor, energizing the second motor coil of the axial flux motor.

9. The method of claim 8, wherein the rotating magnetic return path comprises a perpendicular magnetic return path component that is oriented to couple the actuator magnet array magnetic field in a direction perpendicular to a north/south magnet orientation of the actuator magnet array.

10. The method of claim 8, wherein the rotating magnetic return path member comprises a parallel magnetic return path component that is oriented to couple the actuator magnet array magnetic field in a direction parallel to a north/south magnet orientation of the actuator magnet array.

11. The method of claim 8, wherein the rotor platform member further comprises a rotor platform magnetic return path.

12. The method of claim 8, wherein the trigger magnet array includes at least two trigger magnets for every actuator magnet of the actuator magnet array.

13. The method of claim 12, wherein the trigger magnet array alternates in sequence between at least two trigger magnets having a first axial polarity orientation and at least two trigger magnets having a second axial polarity orientation.

14. The method of claim 12, wherein the trigger magnet array includes a trigger magnet having a first axial polarity orientation and a trigger magnet having a second axial polarity orientation between every pair of actuator magnets of the actuator magnet array.

15. A method for assembling an axial flux motor, the method comprising:
    providing an axial flux motor housing;
    coupling a stator to the axial flux motor housing, the stator comprising a first motor coil, a second motor coil, a first hall sensor, and a second hall sensor; and
    coupling a rotor to the axial flux motor housing, the rotor comprising a rotor platform member, an actuator magnet array coupled to the rotor platform member, the actuator magnet array arranged in an alternating axial polarity arrangement and positioned to provide an actuator magnet array magnetic field that intersects with a first motor coil magnetic field and a second motor coil magnetic field, a trigger magnet array coupled to the rotor platform member, the trigger magnet array positioned to provide a trigger magnet array magnetic field that intersects with the first hall sensor and the second hall sensor, and a rotating magnetic return path member coupled to the rotor platform member and configured to confine the actuator magnet array magnetic field from the actuator magnet array.

* * * * *